(12) United States Patent
Suyama et al.

(10) Patent No.: US 9,162,359 B2
(45) Date of Patent: Oct. 20, 2015

(54) ROBOT SYSTEM AND METHOD FOR CONTROLLING ROBOT SYSTEM

(71) Applicant: KABUSHIKI KAISHA YASKAWA DENKI, Kitakyushu-shi (JP)

(72) Inventors: Takashi Suyama, Kitakyushu (JP); Tamio Nakamura, Kitakyushu (JP); Dai Kouno, Kitakyushu (JP); Takashi Nishimura, Kitakyushu (JP); Tomohiro Matsuo, Kitakyushu (JP); Shinichi Ishikawa, Kitakyushu (JP); Tomoki Kawano, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/207,655

(22) Filed: Mar. 13, 2014

(65) Prior Publication Data
US 2014/0277724 A1    Sep. 18, 2014

(30) Foreign Application Priority Data
Mar. 15, 2013    (JP) ................. 2013-052806

(51) Int. Cl.
G05B 19/04    (2006.01)
G05B 19/18    (2006.01)
B25J 9/16    (2006.01)

(52) U.S. Cl.
CPC ................. B25J 9/1676 (2013.01)

(58) Field of Classification Search
CPC ................. B25J 9/1676

USPC .......... 700/245, 250, 255, 258, 259; 901/1, 8, 901/14, 23, 46, 47
See application file for complete search history.

(56) References Cited

U.S. PATENT DOCUMENTS

| | | | | |
|---|---|---|---|---|
| 5,047,700 A | * | 9/1991 | Szakaly | 318/568.1 |
| 5,197,846 A | * | 3/1993 | Uno et al. | 414/731 |
| 5,357,824 A | * | 10/1994 | Hashimoto | 74/490.03 |
| 5,528,955 A | * | 6/1996 | Hannaford et al. | 74/490.01 |

(Continued)

FOREIGN PATENT DOCUMENTS

| | | |
|---|---|---|
| EP | 2047955 | 4/2009 |
| JP | 06-226683 | 8/1994 |

(Continued)

OTHER PUBLICATIONS

Japanese Office Action for corresponding JP Application No. 2013-052806, Sep. 30, 2014.

(Continued)

*Primary Examiner* — Khoi Tran
*Assistant Examiner* — Jorge Peche
(74) *Attorney, Agent, or Firm* — Mori & Ward, LLP (57) ABSTRACT

A robot system of the present disclosure includes: a robot including an operable working arm driven by an actuator; an operation load detection unit configured to detect an operation load of the actuator; a region setting unit that sets a region with a predetermined range around the robot; a moving body detection unit configured to detect a position of a moving body other than the robot; and an abnormality determination unit that determines abnormality when detecting of the position of the moving body within the region, wherein the region setting unit changes the range of the region in accordance with the operation load of the actuator.

14 Claims, 7 Drawing Sheets

(56) References Cited

U.S. PATENT DOCUMENTS

| | | | |
|---|---|---|---|
| 5,956,465 A * | 9/1999 | Takagi et al. | 700/255 |
| 6,684,128 B1 * | 1/2004 | Tounai et al. | 700/245 |
| 7,761,231 B2 * | 7/2010 | Kawabe et al. | 701/493 |
| 8,024,067 B2 * | 9/2011 | Sakai et al. | 700/245 |
| 8,295,975 B2 * | 10/2012 | Arimatsu et al. | 700/216 |
| 2005/0166413 A1 * | 8/2005 | Crampton | 33/503 |
| 2005/0179416 A1 * | 8/2005 | Iribe et al. | 318/563 |
| 2006/0173577 A1 * | 8/2006 | Takeda et al. | 700/245 |
| 2007/0021868 A1 * | 1/2007 | Nagatsuka et al. | 700/245 |
| 2007/0027579 A1 * | 2/2007 | Suzuki et al. | 700/245 |
| 2007/0265731 A1 * | 11/2007 | Merk et al. | 700/245 |
| 2008/0235970 A1 * | 10/2008 | Crampton | 33/503 |
| 2009/0043440 A1 * | 2/2009 | Matsukawa et al. | 701/25 |
| 2009/0091286 A1 * | 4/2009 | Nihei et al. | 318/568.13 |
| 2010/0292843 A1 * | 11/2010 | Kariyazaki et al. | 700/264 |
| 2011/0270444 A1 * | 11/2011 | Nagata et al. | 700/258 |
| 2012/0004775 A1 * | 1/2012 | Andoh | 700/259 |
| 2012/0029686 A1 * | 2/2012 | Ban et al. | 700/218 |
| 2012/0102374 A1 * | 4/2012 | Garcia et al. | 714/718 |
| 2012/0133318 A1 * | 5/2012 | Komatsu et al. | 318/563 |
| 2012/0290132 A1 * | 11/2012 | Kokubo et al. | 700/255 |
| 2012/0328395 A1 * | 12/2012 | Jacobsen et al. | 414/1 |
| 2013/0173060 A1 * | 7/2013 | Yoo et al. | 700/261 |
| 2015/0189202 A1 * | 7/2015 | Kano | |

FOREIGN PATENT DOCUMENTS

| | | | |
|---|---|---|---|
| JP | 09-272096 | | 10/1997 |
| JP | 2002-036165 | | 2/2002 |
| JP | 4219870 | B2 | 2/2006 |
| JP | 2006-329263 | | 12/2006 |
| JP | 2010052114 | A * | 3/2010 |
| JP | 2010-167523 | | 8/2010 |
| JP | 2010-208002 | | 9/2010 |
| JP | 2010208002 | A * | 9/2010 |

OTHER PUBLICATIONS

Chinese Office Action for corresponding CN Application No. 201410019965.5, Jun. 2, 2015.

Japanese Office Action for corresponding JP Application No. 2013-052806, Jun. 2, 2015.

* cited by examiner

ROBOT SYSTEM AND METHOD FOR CONTROLLING ROBOT SYSTEM

CROSS-REFERENCE TO RELATED APPLICATION

This application claims priority from Japanese Patent Application No. 2013-052806 filed with the Japan Patent Office on Mar. 15, 2013, the entire content of which is hereby incorporated by reference.

BACKGROUND

1. Technical Field

The present disclosure relates to a robot system and a method for controlling the robot system.

2. Related Art

Conventionally, a robot with an operable working arm has been suggested. In general, a safety fence is disposed around the working arm to separate an operation region for the working arm separated from an operation region for people. However, for example, a person may enter the safety fence to supply the work object. Further, in recent years, both the robot and the people have expanded opportunities to work together in a space where the operation regions for the working arm and the people are not separated. The use of the robot in such a circumstance may cause a risk that the robot and a person interfere with each other if the person enters the operation region for the working arm. A safety countermeasure has been built for avoiding such a risk. For example, a man•machine working system disclosed in Japanese Patent No. 4219870 includes a transmitter provided for a person, a receiver attached to a device to respond to the transmitter, and a position detector. The position detector detects the position of the person relative to the device by calculating an output signal from the receiver.

In the man•machine working system disclosed in Japanese Patent No. 4219870, the positional relation of the person to the device is detected by the position detector. Based on the positional relation, the operation region for people is set.

For example, a robot system according to JP-A-2010-167523 includes a human detection device for detecting the presence of a human within an operation region for an industrial robot.

The robot system according to JP-A-2010-167523 includes an electric supply adjusting device for adjusting the amount of current to be supplied to a robot control device. In this robot system, the electric supply adjusting device changes the amount of current in response to a signal output from the human detection device.

SUMMARY

A robot system of the present disclosure includes: a robot including an operable working arm driven by an actuator; an operation load detection unit configured to detect an operation load of the actuator; a region setting unit that sets a region with a predetermined range around the robot; a moving body detection unit configured to detect a position of a moving body other than the robot; and an abnormality determination unit that determines abnormality when detecting of the position of the moving body within the region, wherein the region setting unit changes the range of the region in accordance with the operation load of the actuator.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A robot system of an exemplary aspect of the present disclosure includes: a robot including an operable working arm driven by an actuator; an operation load detection unit configured to detect an operation load of the actuator; a region setting unit that sets a region with a predetermined range around the robot; a moving body detection unit configured to detect a position of a moving body other than the robot; and an abnormality determination unit that determines abnormality when detecting of the position of the moving body within the region, wherein the region setting unit changes the range of the region in accordance with the operation load of the actuator.

The robot may have a base that supports the working arm and a moving mechanism configured to move the base.

A process of the abnormality determination by the abnormality determination unit may include at least one control of motion of operation of the robot, issuing of alarm, reduction of motion speed of the robot, and reduction of operation load of the actuator.

The robot may execute a plurality of works by having a motion program installed therein. The motion program may contain information that defines the motion speed of the robot.

The robot may execute a plurality of works by having a motion program installed therein. The abnormality determination unit may perform different abnormality determination in accordance with the work of the robot in execution when detecting the position of the moving body within the region.

The operation load detection unit may detect at least one component of an X-direction component, a Y-direction component, and a Z-direction component on an XYZ coordinate system of the operation load at an end of the working arm. Further, the region setting unit may set the range of the region in accordance with at least one component among the X-direction component, the Y-direction component, and the Z-direction component of the load detected by the operation load detection unit.

The moving body detection unit may be a laser ranging device, a photographing device, or a data receiving device. The data receiving device is configured to read data from an IC tag provided for the moving body.

The region setting unit may set a plurality of different regions around the robot. The abnormality determination unit may perform different abnormality determination for each of the regions.

The abnormality determination unit may cancel the abnormality determination when detecting that the position of the moving body is not within the region after the abnormality determination.

The operation load detection unit may detect the operation load by estimating the operation load based on at least one of a driving current value of the actuator and posture data for the robot. Further, the operation load detection unit may detect the operation load by estimating the operation load based on content of a motion order input to the robot.

A method for controlling a robot system of another exemplary aspect of the present disclosure includes: detecting an operation load of an actuator of a robot having a working arm driven by the actuator; setting a region with a predetermined range around the robot; detecting a position of a moving body other than the robot; and determining abnormality when detecting of the position of the moving body within the region, wherein the setting of the region includes changing the range of the region in accordance with the operation load of the actuator.

Other objects and characteristics of the present disclosure will be made apparent from the embodiments to be described below with reference to the attached drawings.

The robot system and the method for controlling the robot system according to the present disclosure further improve the safety of the robot system.

First Embodiment

Figure 1:
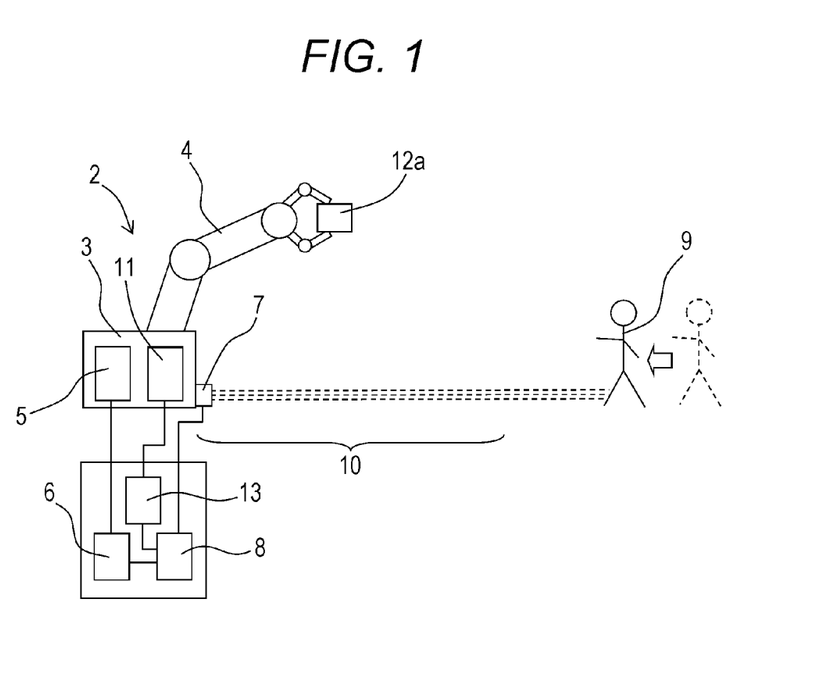
FIG. 1 is a schematic diagram illustrating the operation of a robot system according to a first embodiment.
Figure 2:
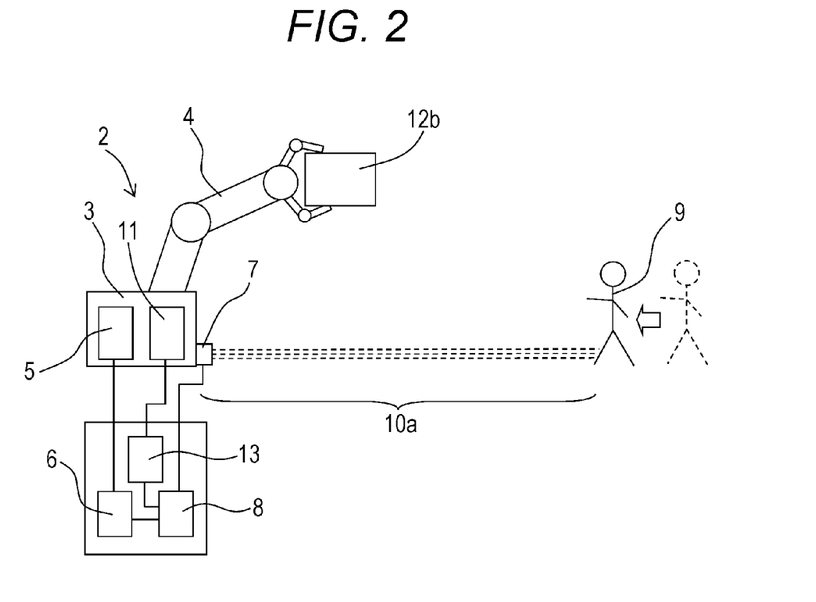
FIG. 2 is a schematic diagram illustrating an example in which the operation load of an actuator is greater than that in the state depicted in FIG. 1.
Figure 3:
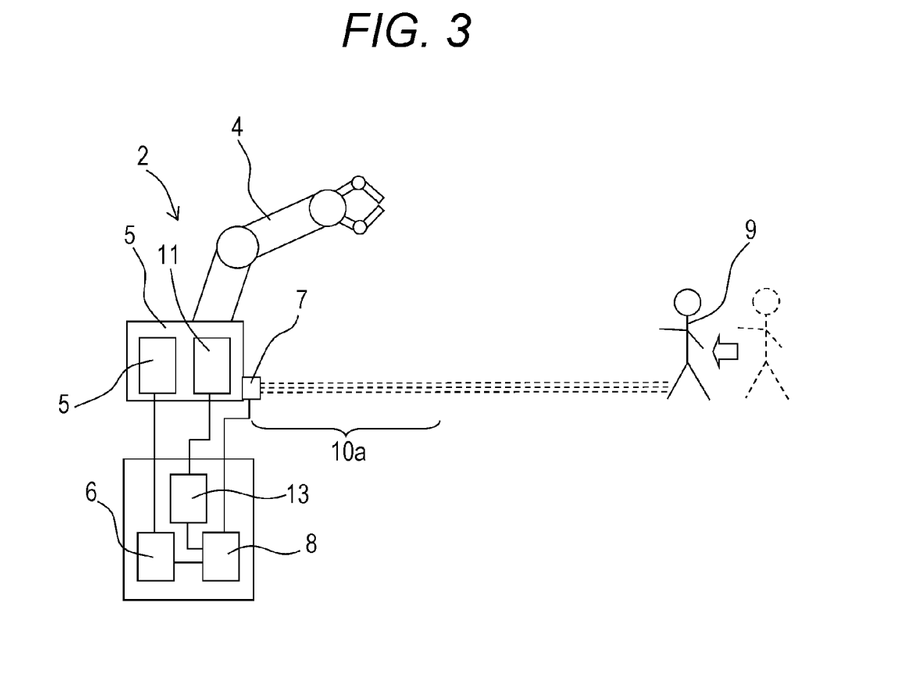
FIG. 3 is a schematic diagram illustrating an example in which the operation load of the actuator is less than that in the state depicted in FIG. 1.

A robot system according to a first embodiment is hereinafter described with reference to the drawings. FIG. 1 is a schematic diagram illustrating an operation of the robot system according to the first embodiment. FIG. 2 is a schematic diagram illustrating an example in which operation load of an actuator is greater than that in the state illustrated in FIG. 1. FIG. 3 is a schematic diagram illustrating an example in which operation load of the actuator is less than that in the state illustrated in FIG. 1.

Here, FIG. 1 illustrates a state in which a hand at an end of a working arm 4 holds an article 12a. FIG. 2 illustrates a state in which the hand at the end of the working arm 4 holds an article 12b, which is larger than the article 12a illustrated in FIG. 1. FIG. 3 illustrates the state in which the hand at the end of the working arm 4 holds nothing.

In the state illustrated in FIG. 2, therefore, the operation load of the actuator 11 is greater than that in the state illustrated in FIG. 1. On the other hand, in the state illustrated in FIG. 3, the operation load of the actuator 11 is less than that in the state illustrated in FIG. 1. The operation load of the actuator 11 variously changes in this manner when the hand at the end of the working arm 4 holds different products depending on the work of the working arm 4. FIG. 1, FIG. 2, and FIG. 3 depict examples for describing the magnitude of the operation load of the actuator 11. The operation load of the actuator 11 changes not just by the holding of the article 12a as illustrated in FIG. 1.

As illustrated in FIG. 1, a robot system 2 includes a robot 3, an operation load detection unit 5, a region setting unit 6, a moving body detection unit 7, an abnormality determination unit 8, and a motion control unit 13. The robot 3 has the working arm 4 driven by the actuator 11. The working arm 4 is driven by the actuator 11 to execute the operation such as expansion, contraction, stretch, or rotation. The robot 3 includes one or more working arms 4. The operation load detection unit 5 detects the operation load of the actuator 11. The operation load of the actuator 11 refers to the load consuming the energy generated by the actuator 11. The operation load of the actuator 11 corresponds to, for example, static load, resistance load, or inertial load. The static load refers to a force required for the hand at the end of the working arm 4 to hold the article 12a. The resistance load refers to a force for driving the working arm 4 or keeping the posture of the working arm 4. The inertial load refers to a force that resists the inertia generated due to the acceleration or deceleration for driving the working arm 4. The region setting unit 6 sets a region 10 with a predetermined range around the robot 3. The region 10 may be a circular region with a predetermined radius in which the working arm 4 serves as a center. The moving body detection unit 7 detects the position of a moving body 9 other than the robot 3. The moving body 9 other than the robot 3 corresponds to, for example, a person, a hand lift, a conveyer truck, or a self-running robot other than the robot 3. In particular, the moving body 9 may be a person or a human-powered traveling body. The abnormality determination unit 8 determines the abnormality when detecting of the position of the moving body 9 within the region 10.

The motion control unit 13 controls the motion of the robot 3 or the working arm 4. In accordance with the motion program to be described later, the motion control unit 13 outputs the motion order to the actuator 11 of the working arm 4. On the other hand, the motion control unit 13 monitors the positional information or the like of the actuator 11 and controls the working arm 4 so that the working arm 4 operates based on the motion order. The motion control unit 13 changes the motion speed of the working arm 4 or stops the working arm 4 on the basis of the abnormality determination made by the abnormality determination unit 8.

Further, the robot system 2 includes a storage unit (not shown) for storing the motion program or the parameters necessary for the control.

In the robot system 2, the region setting unit 6 changes the range of the region 10 in accordance with the operation load of the actuator 11. In the robot system 2 as above, high safety can be achieved. In other words, when the operation load of the actuator 11 is large as illustrated in FIG. 2, the range of the region 10 where the abnormality determination is performed is wide as a region 10a illustrated in FIG. 2. On the other hand, when the operation load of the actuator 11 is small as illustrated in FIG. 3, the range of the region 10 where the abnormality determination is performed is narrow as a region 10b illustrated in FIG. 3. In this manner, the robot system 2 can variably set the region 10 where the abnormality is determined upon the entry of the moving body 9. Therefore, the moving body 9 can secure the minimum safety distance in accordance with the work of the robot 3. This reduces the space occupied by the robot 3. If the moving body 9 is absent in the region 10, the robot 3 can operate without the abnormality determination. As a result, deterioration in productivity and rate of operation of the robot 3 can be suppressed.

The robot system 2 illustrated in FIG. 1 includes, for example, the robot 3 having the multi-joint working arm 4, which is disposed on a floor, a ceiling, a wall surface, or the like. The robot 3 is not limited to the robot 3 described above as long as the robot has the working arm 4 driven by the actuator 11. For example, although not shown, the robot 3 may have a base that supports the working arm 4 and a moving mechanism that moves this base.

In the robot system 2 illustrated in FIG. 1, the operation load detection unit 5 is disposed in the robot 3. As the operation load detection unit 5, for example, a sensor for converting the load or force into an electric signal, such as a load cell, is given. The operation load detection unit 5 may be a device configured to detect the operation load by estimating the operation load based on at least one of the driving current value of the actuator 11 and the posture data for the robot 3. For example, the operation load detection unit 5 may include a driving current value measurement unit, a load data storage unit, and an operation load estimation and detection unit (all of which are not shown). The driving current value measurement unit measures the driving current value of the actuator 11. The load data storage unit stores the load current value characteristic of the actuator 11 in advance. The operation load estimation and detection unit estimates and detects the operation load of the actuator 11 based on the load current value characteristic and the driving current value. The operation load estimation and detection unit reads out the load current value characteristic from the load data storage unit. Then, by comparing the load current value characteristic and the driving current value measured by the driving current value measurement unit, the operation load estimation and detection unit estimates and detects the operation load of the current actuator 11. The operation load detection unit 5 may be configured to detect the operation load of the actuator 11 not directly but indirectly.

The moving body detection unit 7 detects the position of the moving body 9 other than the robot 3 around the robot 3. If the moving body 9 as the detection target is the one moving on the floor, the moving body detection unit 7 such as a laser ranging device may be disposed at a predetermined height from the floor as illustrated in FIG. 1 to detect the position of the moving body 9 at the predetermined height. The moving body detection unit 7 is not limited to the laser ranging device. The moving body detection unit 7 may be, for example, a photographing device or a data receiving device for reading data from an IC tag provided for the moving body 9.

The region setting unit 6 may have a storage unit for storing correlation data. The correlation data are obtained by associating the operation load of the actuator 11 and the range of the region 10 in advance. The region setting unit 6 reads out the correlation data from such a storage unit. The region setting unit 6 can set the range of the region 10 that is suitable for the operation load detected by the operation load detection unit 5 on the basis of the correlation data.

The abnormality determination unit 8 determines whether the state is abnormal or not based on the range of the region 10 set by the region setting unit 6 and the position of the moving body 9 detected by the moving body detection unit 7. In other words, the state is determined as being abnormal when detecting of the position of the moving body 9 within the region 10. For example, the state is determined as being abnormal if an appropriate distance is not secured between the moving body 9 and the robot 3. Upon the determination of abnormality, the motion control unit 13 performs a predetermined process. This predetermined process may include at least one control of the stop of motion of the robot 3, the issuing of alarm, the reduction of speed of the robot 3, and the reduction of operation load of the actuator 11. If the motion of the robot 3 stops, the contact between the moving body 9 and the robot 3 is unlikely to happen unless the moving body 9 gets closer to interfere with the robot 3. Thus, the safety of the moving body 9 can be secured. Upon the determination of the abnormality, the motion control unit 13 may issue an alarm. This can warn the moving body 9 or another worker around the moving body 9 that the moving body 9 is too close to the robot 3. This can suppress the interference between the moving body 9 and the robot 3. Even though the moving body 9 interferes with the robot 3, the influence of the interference on the moving body 9 can be reduced by reducing the motion speed of the robot 3. When the motion speed of the robot 3 is reduced, the moving body 9 can be easily retracted. By reducing the operation load of the actuator 11, the influence from the interference between the moving body 9 and the working arm 4 can be reduced.

Figure 4:
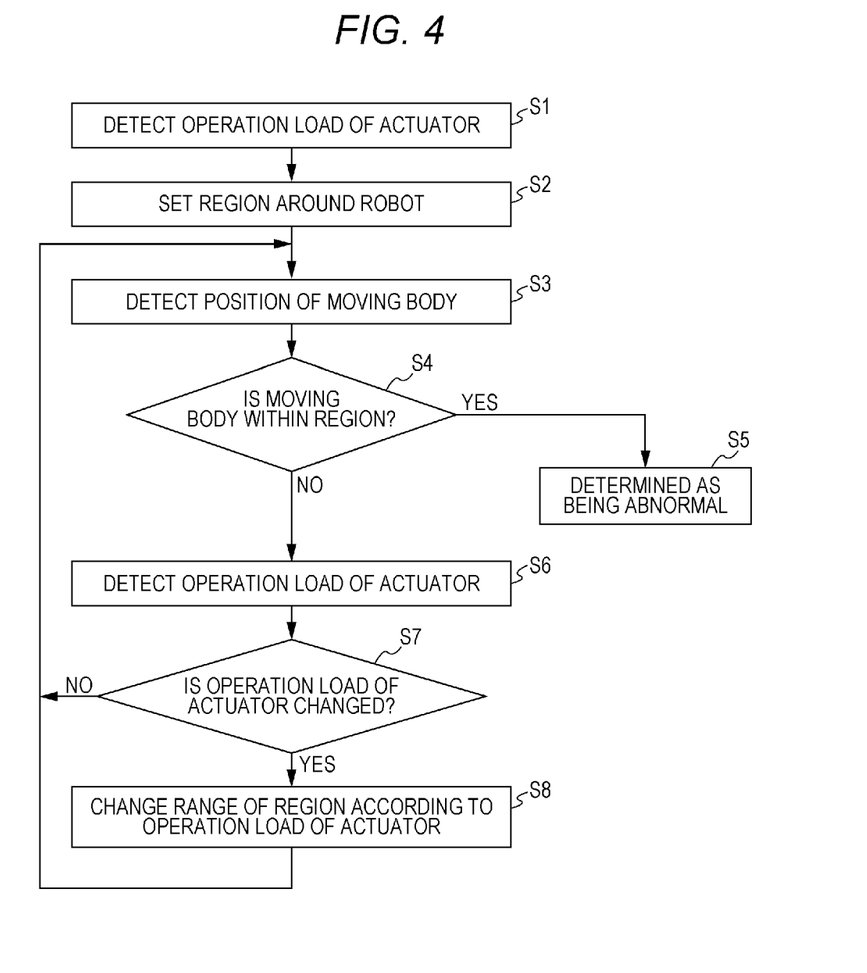
FIG. 4 is a flowchart illustrating the procedure for changing a range of a region and the procedure for abnormality determination in the robot system according to the first embodiment.

The procedures for changing the range of the region 10 and determining the abnormality according to the robot system 2 as above are illustrated in the flowchart. FIG. 4 is a flowchart illustrating the procedure for changing the range of the region 10 and determining the abnormality according to the robot system 2 of the first embodiment. In the robot system 2, first, the operation load detection unit 5 detects the operation load of the actuator 11 in Step S1. The detection of the operation load of the actuator 11 is to set the region 10 initially around the robot 3. The operation load detection unit 5 may be, for example, a sensor such as a load cell. The operation load detection unit 5 may detect the operation load by estimating the operation load based on at least one of the driving current value of the actuator 11 and the posture data for the robot 3.

Next, in Step S2, the region setting unit 6 sets the region 10 around the robot 3 based on the detected operation load of the actuator 11. If there is any change in the operation load of the actuator 11, this region 10 varies depending on the operation load of the actuator 11 as appropriate in Step S7 and Step S8 to be described later. If the operation load of the actuator 11 is large, the range of the region 10 is set wider. Meanwhile, if the operation load of the actuator 11 is small, the range of the region 10 is set narrower. The region setting unit 6 may include a storage unit storing the correlation data in which the operation load of the actuator 11 and the range of the region 10 are associated with each other. In this case, the region setting unit 6 may set the range of the region 10 as below. First, the region setting unit 6 reads out the correlation data from the storage unit. Then, the region setting unit 6 sets the range of the region 10 to match the operation load detected by the operation load detection unit 5.

Next, in Step S3, the moving body detection unit 7 detects the position of the moving body 9. The moving body detection unit 7 may be, for example, a laser ranging device, a photographing device, or a data receiving device for reading data from an IC tag provided for the moving body 9.

Next, in Step S4, the abnormality determination unit 8 determines whether the position of the moving body 9 is within the region 10 or not. If the position of the moving body 9 is within the region 10, the process advances to Step S5 where the state is determined as being abnormal. In other words, if the position of the moving body 9 is within the region 10, the state is determined as being abnormal because the moving body 9 does not secure enough distance relative to the operation load of the actuator 11. If the state is determined as being abnormal, an appropriate instruction may be given to at least one of the robot 3 and the moving body 9. This secures the safety of the robot 3 and the moving body 9. If the position of the moving body 9 is not within the region 10, the state is not determined as being abnormal. On this point, the motion of the robot 3 and the work of the moving body 9 are not restricted.

If the position of the moving body 9 is not within the region 10 as described above, the process proceeds to Step S6. In this step, the operation load of the actuator 11 is detected again. In other words, the operation load of the actuator 11 is not always constant, and may vary during the work of the robot 3. Therefore, if the state is not determined as being abnormal in Step S4, the operation load detection unit 5 detects the operation load of the actuator 11 again. Next, in Step S7, the region setting unit 6 checks if there is a change in the operation load of the actuator 11. If there is a change in the operation load of the actuator 11, the process proceeds to Step S8 where the region setting unit 6 changes the range of the region 10 in accordance with the operation load of the actuator 11. The operation load detection unit 5 may detect the operation load of the actuator 11 continuously. In this case, the region setting unit 6 may change the range of the region 10 in accordance with the operation load of the actuator 11 in real time. That is, for the convenience of the description, the operation load of the actuator 11 is detected again in Step S6 after the detection of the position of the moving body 9 in Step S3 and the determination on whether the position of the moving body 9 is within the region 10 in Step S4. However, the operation load of the actuator 11 may be detected continuously in parallel to the detection of the position of the moving body 9 in Step S3 and the determination on whether the position of the moving body 9 is within the region 10 in Step S4. Then, the range of the region 10 may be changed as appropriate in accordance with the change in operation load of the actuator 11.

If there is no change in the operation load of the actuator 11 in Step S7, the process returns to Step S3 where the moving body detection unit 7 detects the position of the moving body 9 again. In other words, even though the state is not determined as being abnormal in Step S4, the further movement of the moving body 9 would change the position. Thus, even though there is no change in the operation load in Step S7, the moving body detection unit 7 detects the position of the moving body 9 again. Moreover, even in the case where the range of the region 10 is changed in Step S8, the process returns to Step S3 similarly and the moving body detection unit 7 detects the position of the moving body 9 again. Then, based on the result of detecting the position of the moving body 9, the abnormality determination unit 8 determines again whether the position of the moving body 9 is within the region 10 or not in Step S4. Further, in a manner similar to the detection of the operation load of the actuator 11, the moving body detection unit 7 may continuously detect the position of the moving body 9. In other words, the abnormality determination unit 8 may determine whether the real-time position of the moving body 9 is within the region 10 changed according to the real-time operation load of the actuator 11 by knowing the real-time position of the moving body 9.

For example, in a known robot system, the operation region for people has been uniformly set according to the positional relation relative to the robot. Therefore, the influence (risk) depending on the operation load of the actuator 11 has not been taken into consideration in the known robot system. In the robot system 2 of this embodiment described so far, the range of the region 10 can be changed according to the operation load of the actuator 11. Therefore, even though the moving body 9 is always present at the same position, for example, the state may be determined as being abnormal if the enough safety distance is no longer secured relative to the operation load of the actuator 11. Therefore, the moving body 9 can secure the minimum safety distance according to the work of the robot 3. This can reduce the space occupied by the robot 3. Moreover, when the moving body 9 is not present in the region 10, the robot 3 can operate at the original speed. Since this can shorten the takt time, the productivity and rate of operation of the robot 3 can be improved.

First Modified Example

Figure 5:
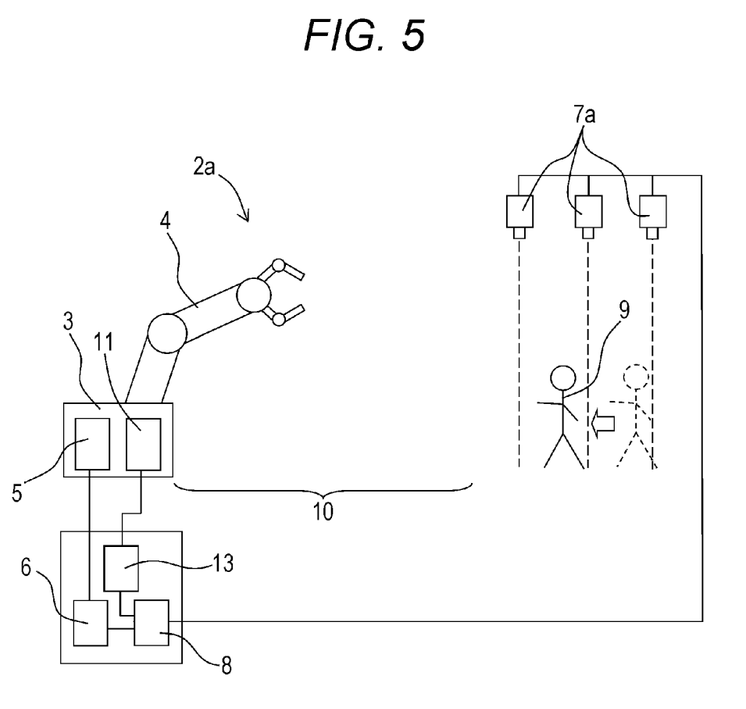
FIG. 5 is a schematic diagram illustrating the operation of the robot system according to a first modified example.

FIG. 5 is a schematic diagram illustrating the operation of a robot system according to a first modified example. As illustrated in FIG. 5, a robot system 2a includes the robot 3, the operation load detection unit 5, the region setting unit 6, a moving body detection unit 7a, the abnormality determination unit 8, and the motion control unit 13. The moving body detection unit 7a of the robot system 2a includes a plurality of moving body sensing sensors disposed on a ceiling around the robot 3. These moving body sensing sensors are disposed at predetermined intervals at different positions whose distance from the robot 3 is different. In the robot system 2a, the position of the moving body 9 other than the robot 3 can be detected using such plural moving body sensing sensors. In the example illustrated in FIG. 5, the three moving body sensing sensors are disposed at almost equal intervals on the ceiling around the robot 3. The moving body sensing sensor may be, for example, a known sensor using an infrared ray, an ultrasonic wave, visible light, or the like. Since the other configurations of the robot system 2a of the first modified example are similar to those of the first embodiment, the description is omitted.

Second Modified Example

Figure 6:
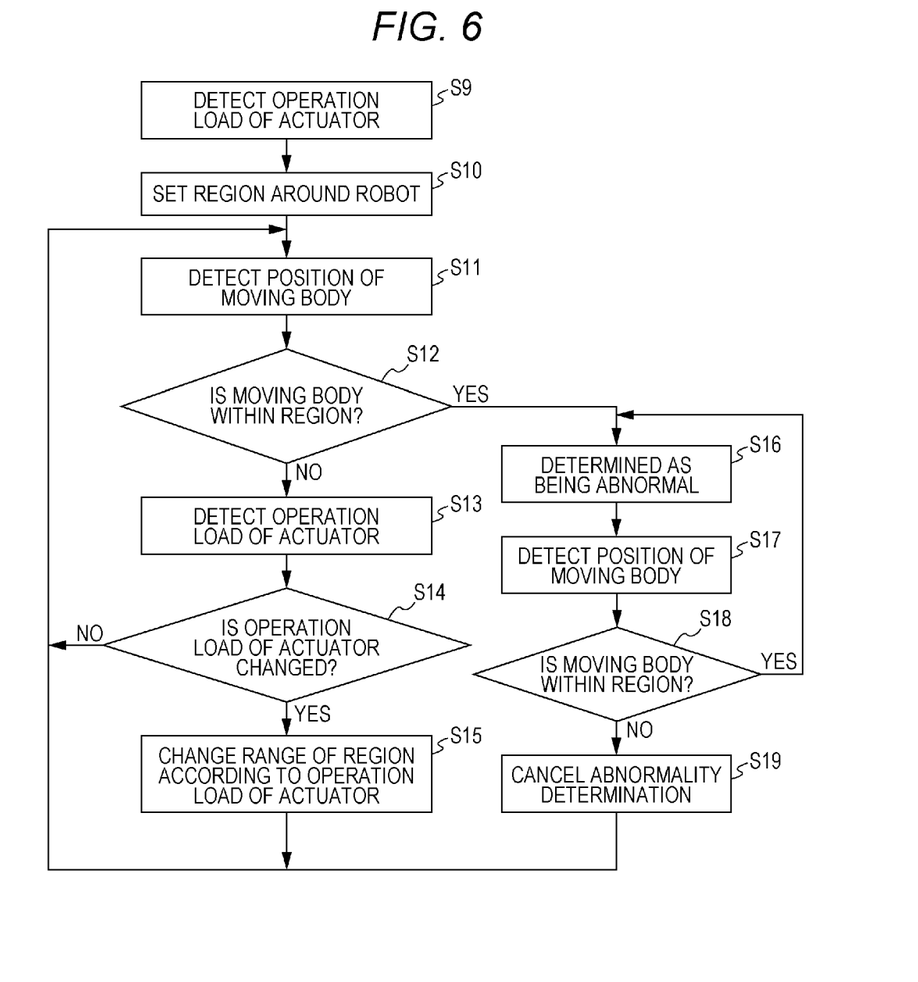
FIG. 6 is a flowchart illustrating the procedure for changing a range of a region and the procedure for abnormality determination in a robot system according to a second modified example.

FIG. 6 is a flowchart illustrating the procedure for changing the range of the region 10 and the procedure for the abnormality determination of the robot system 2 or 2a according to a second modified example. As illustrated in FIG. 6, in the procedure according to the second modified example, the operation load detection unit 5 first detects the operation load of the actuator 11 (or the working arm 4) in Step S9. Next, in Step S10, the region setting unit 6 sets the region 10 around the robot 3 on the basis of the detected operation load of the actuator 11. Then, in Step S11, the moving body detection unit 7 or 7a detects the position of the moving body 9. Next, in Step S12, the abnormality determination unit 8 determines whether the position of the moving body 9 is within the region 10 or not. If the position of the moving body 9 is within the region 10, the process advances to Step S16 where the state is determined as being abnormal. In the procedure according to the second modified example, after the abnormality determination in Step S16, the moving body detection unit 7 or 7a detects the position of the moving body 9 again in Step S17. Then, in Step S18, the abnormality determination unit 8 determines whether the position of the moving body 9 is within the region 10 or not. Then, if the position of the moving body 9 is detected within the region 10, the process returns to Step S16 and the abnormality determination is maintained. If the position of the moving body 9 is not within the region 10, the process advances to Step S19 where the abnormality determination is cancelled. Thus, in the procedure illustrated in FIG. 6, even after the abnormality determination in Step S16, the position of the moving body 9 is detected. Then, if the moving body 9 is not confirmed within the region 10 due to, for example, the retraction of the moving body 9, the safety of the moving body 9 is regarded as being assured and the abnormality determination is cancelled. This improves the productivity and the rate of operation of the robot 3. The expression "the abnormality determination is cancelled" refers to that "the robot 3 operates at higher speed than the motion speed after the abnormality determination". For cancelling the abnormality determination, the motion control unit 13 may reset the robot 3 so that the robot 3 operates at the motion speed immediately before the abnormality determination. If the position of the moving body 9 is determined as not being within the region 10 in Step S12, the steps after this advance according to the procedure similar to that of the robot system 2 of the first embodiment. In other words, in Step S13, the operation load of the actuator 11 is detected again. Then, in Step S14, whether there is a change in operation load of the actuator 11 is determined. If there is a change in operation load of the actuator 11, the process advances to Step S15 where the range of the region 10 is changed according to the operation load of the actuator 11. Then, the process returns to Step S11 and the position of the moving body 9 is detected again. If there is no change in operation load of the actuator 11 in Step S14, the process returns to Step S11 and the position of the moving body 9 is detected again.

Third Modified Example

Figure 7:
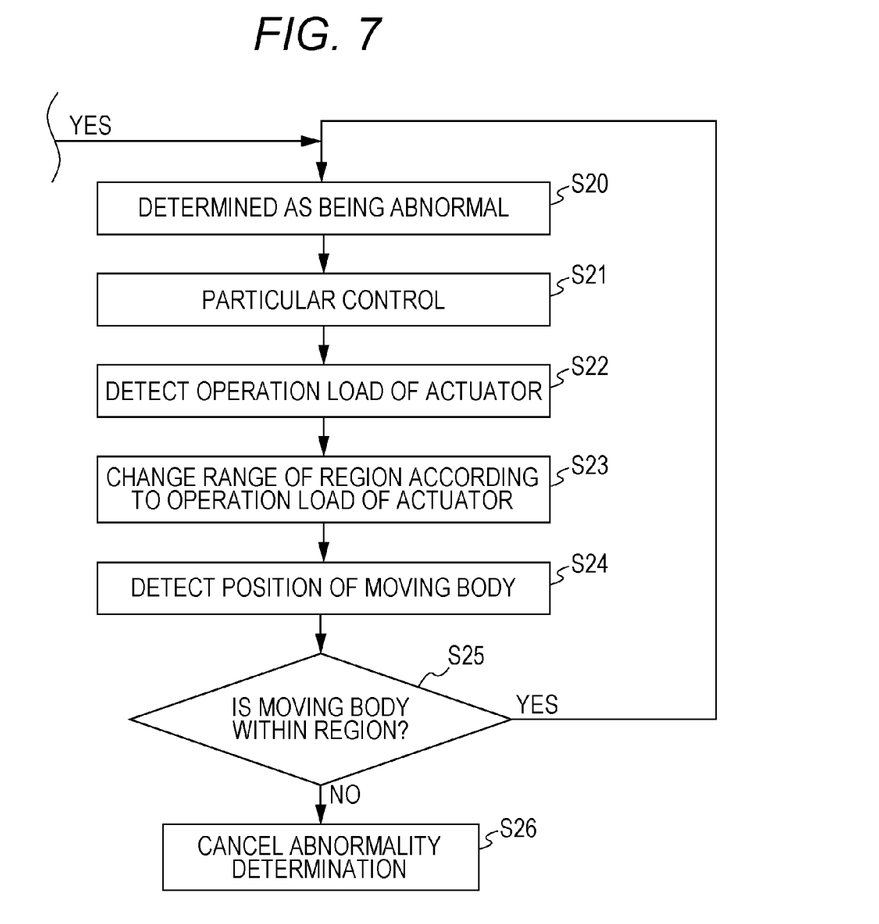
FIG. 7 is a flowchart illustrating the procedure for changing a range of a region and the procedure for abnormality determination in a robot system according to a third modified example.

FIG. 7 is a flowchart illustrating the procedure for changing the range of the region 10 and the procedure for the abnormality determination of the robot system 2 or 2a according to a third modified example. FIG. 7 is a flowchart of the process after the determination on whether the position of the moving body 9 is within the region 10 or not, and after the abnormality determination step (Step S20). The procedure before Step S20 is similar to that illustrated in FIG. 4; thus, the procedure before Step S20 is not illustrated in FIG. 7. As illustrated in FIG. 7, in the procedure according to the third modified example, particular control is executed in Step S21 upon the abnormality determination in Step S20. The particular control corresponds to at least one control of the stop of motion of the robot 3, the issuing of alarm, the reduction of the motion speed of the robot 3, and the reduction of the operation load of the actuator 11. In the robot system according to the third modified example, the operation load of the actuator 11 is detected in Step S22 again after Step S21. Next, in Step S23, the range of the region 10 is changed according to the operation load detected again. After the range of the region 10 is changed, the position of the moving body 9 is detected again in Step S24. Then, in Step S25, whether the position of the moving body 9 is within the region 10 or not is determined. For example, the range of the region 10 is changed by the control for reducing the operation load of the actuator 11. The range of the region 10 after the change is narrower than the range at the abnormality determination in some cases. When detecting that the position of the moving body 9 is not within the range of the region 10 after the change, the process proceeds to Step S26 where the abnormality determination is cancelled. When detecting that the position of the moving body 9 is within the range of the region 10 after the change, the process returns to Step S20 where the abnormality determination is maintained. This improves the productivity and the rate of operation of the robot 3. In particular, in the procedure according to the third modified example, it is possible to suppress that the working efficiency of the robot 3 is deteriorated because of taking the safety countermeasure excessively.

Another Modified Example

The robot 3 is capable of executing a plurality of works by having a motion program installed therein in advance. The motion program may contain the information for defining the motion speed of the robot 3. When the motion program has the information for defining the motion speed of the robot 3, the motion of the robot 3 with high flexibility can be realized.

In other words, the motion speed of the robot 3 can be defined in accordance with the position of the moving body 9. Thus, higher safety and working efficiency can be realized.

Further, the motion program may contain the information for defining the motion speed of the robot 3. The abnormality determination unit 8 may perform different abnormality determination according to the work of the robot 3 in execution if the position of the moving body 9 is detected within the region 10. Depending on the kind of the abnormality determination, the motion control unit 13 may change the process after the abnormality determination. For example, if the work of the robot 3 in execution is highly safe to the moving body 9, the motion control unit 13 may continue a part of the motion of the robot 3 during the abnormality determination. Meanwhile, if the work of the robot 3 in execution is not so safe to the moving body 9, the motion control unit 13 may completely stop the motion of the robot 3 during the abnormality determination. A part of the motion of the robot 3 that is continued may be, for example, a process including the issuing of alarm, or the control for reducing the motion speed of the robot 3. In the process such as the emergency stop of completely stopping the motion of the robot 3, it may take time to restore the state of the robot 3 and restart the motion. Therefore, the different process capable of securing the enough safety may be performed as appropriate after the abnormality determination in accordance with the work in execution. This can realize higher safety and working efficiency.

The operation load detection unit 5 may be configured to detect at least one component of an X-direction component, a Y-direction component, and a Z-direction component on an XYZ coordinate system of the load on the end of the working arm 4. The region setting unit 6 may be configured to set the range of the region 10 in accordance with at least one component among the X-direction component, the Y-direction component, and the Z-direction component of the load detected by the operation load detection unit 5. Even though the absolute value of the operation load of the actuator 11 is the same, the influence from the motion of the working arm 4 may be different depending on the direction of the motion. For example, in the case where the working arm 4 operates in a direction away from the moving body 9, the influence on the moving body 9 from the working arm 4 is smaller than that in the case where the working arm 4 operates in a direction toward the moving body 9. As described above, the load on the end of the working arm 4 may be decomposed into the XYZ coordinate system to set the range of the region 10. Thus, the appropriate safety countermeasure can be built according to the motion content of the robot 3.

The region setting unit 6 may set plural different regions 10 around the robot 3. The abnormality determination unit 8 may perform different abnormality determination for each region 10. For example, the abnormality determination unit 8 may perform the different abnormality determination in the region 10 where the entry or exit of the moving body 9 occurs frequently and the region 10 where the entry or exit of the moving body 9 occurs infrequently. The region setting unit 6 may set the plural regions 10 in each of which the distance from the region boundary to the robot 3 is different (for example, plural nested regions). Then, the abnormality determination unit 8 may perform the abnormality determination in which the operation load of the actuator 11 is more restricted in a region closer to the robot 3 of the plural regions. Thus, the safety countermeasure according to the circumstances around the robot 3 can be built individually.

Second Embodiment

A method for controlling a robot system according to a second embodiment is hereinafter described. The method for controlling the robot system according to the second embodiment is a method for controlling the robot system 2 according to the first embodiment illustrated in FIG. 1. The control method according to the second embodiment includes an operation load detecting step, a region setting step, a moving body detecting step, and an abnormality determining step. In the operation load detecting step, the operation load detection unit 5 detects the operation load of the actuator 11 for driving the working arm 4 of the robot 3 as illustrated in FIG. 1. In the region setting step, the region setting unit 6 sets the region 10 with a predetermined range around the robot 3. In the moving body detecting step, the moving body detection unit 7 detects the position of the moving body 9 other than the robot 3. In the abnormality determining step, the abnormality determination unit 8 determines the abnormality when detecting the position of the moving body 9 within the region 10. In the region setting step, the region setting unit 6 changes the range of the region 10 according to the operation load of the actuator 11.

The procedure for the control in the method for controlling the robot system according to the second embodiment is described in the order of steps with reference to the flowchart illustrated in FIG. 4. First, in Step S1, the operation load detection unit 5 detects the operation load of the actuator 11. Next, in Step S2, the region setting unit 6 sets the region 10 around the robot 3. Then, in Step S3, the moving body detection unit 7 detects the position of the moving body 9 other than the robot 3. In Step S4, subsequently, the abnormality determination unit 8 determines whether the position of the moving body 9 is within the region 10. If the position of the moving body 9 is within the region 10, the process advances to Step S5 where the state is determined as being abnormal. If the position of the moving body 9 is not within the region 10, the process advances to Step S6 where the operation load detection unit 5 detects the operation load of the actuator 11 again. Next, in Step S7, the operation load detection unit 5 determines whether there is a change in the operation load of the actuator 11. If there is a change in the operation load of the actuator 11, the process advances to Step S8 where the region setting unit 6 changes the range of the region 10 according to the operation load of the actuator 11. If there is no change in the operation load of the actuator 11, the process returns to Step S3 and the moving body detection unit 7 detects the position of the moving body 9 again. In Step S8, even when the range of the region 10 is changed, the process returns to Step S3 and the moving body detection unit 7 detects the position of the moving body 9 again. However, if the process includes Step S8, the abnormality determination unit 8 determines whether the position of the moving body 9 is within the region 10 on the basis of the range of the region 10, which has been changed in Step S8, in Step S4 conducted subsequent to Step S3. According to the method for controlling the robot system as above, high safety and working efficiency can be realized. Moreover, the moving body 9 can secure the minimum safety distance in accordance with the work of the robot 3. This can reduce the space occupied by the robot 3. Moreover, when the moving body 9 is not present in the region 10, the robot 3 can operate at the original speed. Accordingly, the takt time can be shortened. This improves the productivity and the rate of operation of the robot 3.

The method for controlling the robot system may be a method for controlling the robot system according to any of the first to third modified examples, or the robot system according to the other modified example. In accordance with the structure of the robot system of each modified example described so far, the operation load detecting step, the region setting step, the moving body detecting step, and the abnormality determining step may be modified as appropriate.

The embodiments have been described so far. However, the present disclosure is not limited thereto. Various modifications and changes can be made within the content thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot system comprising:
   a robot including an operable working arm driven by an actuator;
   an operation load detector configured to detect an operation load of the actuator, the operation load including at least one of a resistance load and an inertial load, the resistance load referring to a force for driving the working arm or keeping a posture of the working arm, and the inertial load referring to a force that resists inertia generated due to acceleration or deceleration for driving the working arm;
   a region setting device configured to set a region with a predetermined range around the robot, the region setting device being configured to change a range of the region in accordance with at least one of the resistance load and the inertial load of the actuator;
   a moving body detector configured to detect a position of a moving body other than the robot; and
   an abnormality determination device configured to determine abnormality when detecting of the position of the moving body within the region.

2. The robot system according to claim 1, wherein the robot has a base that supports the working arm and a moving mechanism configured to move the base.

3. The robot system according to claim 1, wherein a process of an abnormality determination by the abnormality determination device includes at least one control of stop of motion of the robot, issuing of alarm, reduction of motion speed of the robot, and reduction of operation load of the actuator.

4. The robot system according to claim 1, wherein:
   the robot can execute a plurality of works by having a motion program installed therein; and
   the motion program contains information that defines the motion speed of the robot.

5. The robot system according to claim 1, wherein:
   the robot can execute a plurality of works by having a motion program installed therein; and
   the abnormality determination device performs different abnormality determination in accordance with the work of the robot in execution when detecting the position of the moving body within the region.

6. The robot system according to claim 1, wherein:
   the operation load detector detects at least one component of an X-direction component, a Y-direction component, and a Z-direction component on an XYZ coordinate system of the operation load at an end of the working arm; and
   the region setting device sets the range of the region in accordance with at least one component among the X-direction component, the Y-direction component, and the Z-direction component of the load detected by the operation load detector.

7. The robot system according to claim 1, wherein the moving body detector is a laser ranging device, a photographing device, or a data receiving device for reading data from an IC tag provided for the moving body.

8. The robot system according to claim 1, wherein:
the region setting device sets a plurality of different regions around the robot; and
the abnormality determination device performs different abnormality determination for each of the regions.

9. The robot system according to claim 1, wherein the abnormality determination device cancels an abnormality determination when detecting that the position of the moving body is not within the region after the abnormality determination.

10. The robot system according to claim 1, wherein the operation load detector detects the operation load by estimating the operation load based on at least one of a driving current value of the actuator and posture data for the robot.

11. The robot system according to claim 1, wherein the operation load detector detects the operation load by estimating the operation load based on content of a motion order input to the robot.

12. A method for controlling a robot system, comprising:
detecting an operation load of an actuator of a robot having a working arm driven by the actuator, the operation load including at least one of a resistance load and an inertial load, the resistance load referring to a force for driving the working arm or keeping a posture of the working arm, and the inertial load referring to a force that resists inertia generated due to acceleration or deceleration for driving the working arm;
setting a region with a predetermined range around the robot, the setting of the region includes changing a range of the region in accordance with at least one of the resistance load and the inertial load of the actuator;
detecting a position of a moving body other than the robot; and
determining abnormality when detecting of the position of the moving body within the region.

13. The robot system according to claim 1, wherein
the operation load includes static load,
the static load refers to a force required for a hand of the working arm to hold the article, and
the region setting device changes the range of the region in accordance with at least one of the resistance load, the inertial load, and the static load of the actuator.

14. The robot system according to claim 1, wherein the operation load detector includes a load cell.

* * * * *